March 13, 1928.  
E. M. BALLOT  
1,662,229  
APPARATUS FOR REGULATING THE TENSION OF CHAINS  
Filed Nov. 30, 1926
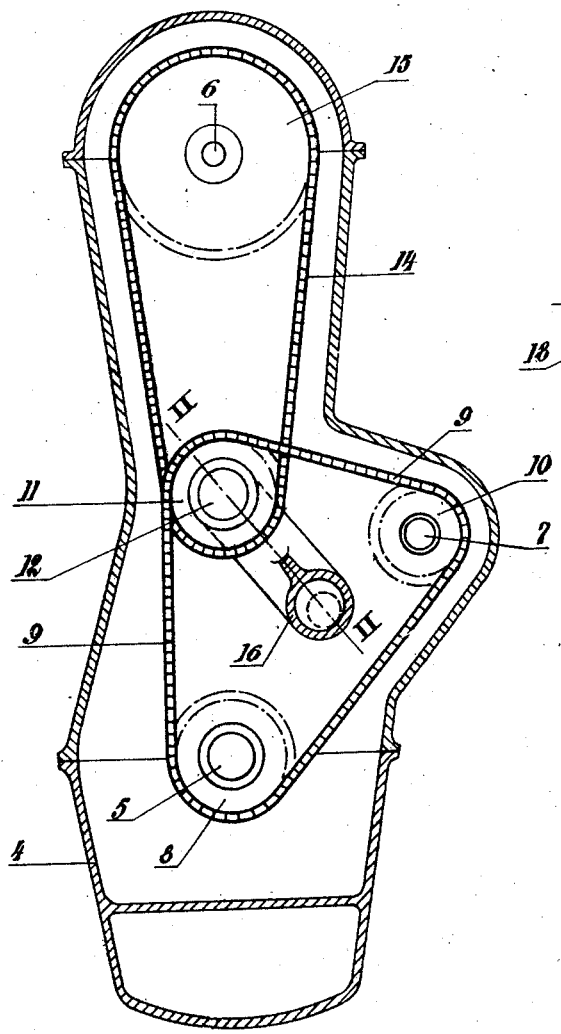
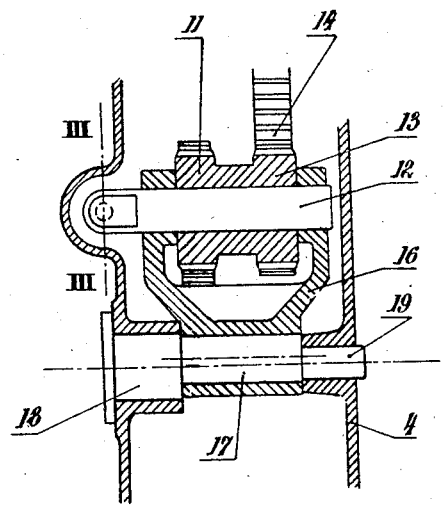
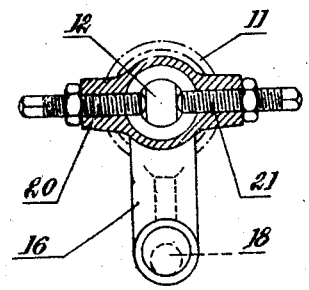
Inventor:  
Ernest M. Ballot.  
By William C. Linton.  
Attorney.

Patented Mar. 13, 1928.

1,662,229

UNITED STATES PATENT OFFICE.

ERNEST MAURICE BALLOT, OF PARIS, FRANCE.

APPARATUS FOR REGULATING THE TENSION OF CHAINS.

Application filed November 30, 1926, Serial No. 151,791, and in France January 29, 1926.

The present invention relates to mechanical devices comprising two power transmission chains, such as the chains which are employed for the control of the shafts for cams, magnetos, pumps or other apparatus utilized with internal combustion engines.

My said apparatus has for its object to suitably regulate the tension of the two chains, and it consists essentially of two chain wheel co-acting respectively with the two chains, the shaft carrying the said pinions being movable in two directions which are suitably selected.

According to a particular form of construction the shaft carrying the two pinions is disposed in a forked bracket placed in suitable position and pivotally mounted on an axle which is eccentric with reference to the journals which maintain it in the stationary frame.

Due to the pivoting of the said forked bracket and to the eccentric position of its axle, the said shaft carrying the two chain wheels can be readily brought to a point at which the two chains will be properly stretched.

A constructional form of my said apparatus is shown by way of example in the appended drawings.

Fig. 1 shows the control devices employed upon an internal combustion engine; Fig. 2 is a section on the line II—II of Fig. 1, and Fig. 3 a section on the line III—III of Fig. 2.

In Fig. 1, 4 is the crankcase of an internal combustion engine, 5 is the crankshaft and 6 the cam shaft 7 is the shaft for the magneto and the accessory devices of the engine.

Upon the crankshaft 5 is mounted a chain wheel 8 coacting with the chain 9 which serves to actuate the chain wheel 10 keyed to the shaft 7, and also the chain wheel 11 which is loose on the axle 12.

As shown in Fig. 2, the wheel 11 is secured to a chain wheel 13 coacting with a chain 14 serving to rotate the chain wheel 15 which is keyed to the cam shaft 6 of the engine.

According to the invention the axle 12 upon which the pair of wheels 11—13 are rotatable, can be displaced in two different directions whereby the said wheels will assume a position such that the chains 9 and 14 will be properly stretched. As shown in the figures the axle 12 is disposed in a forked bracket 16 which is pivotally mounted on the axle 17, this latter being maintained in the crankcase 4 by means of the journals 18 and 19 which are eccentric with reference to the axle 17.

As shown in Fig. 3, the end of the axle 12 is held between two screws 20 and 21 which traverse the crankcase 4 and maintain the shaft in a fixed position which can be properly regulated.

By reason of the pivoting motion which may be given to the bracket 16 on its shaft, 17, and of the motion of the said bracket which is due to the rotation of its eccentric axle 17, the shaft 12 together with the chain wheels 11 and 13 can be brought into a position in which the chains 9 and 14 will be properly stretched.

However, to provide for a more convenient operation, it is preferable to stretch one of the said chains in the first place, for instance the chain 9, and then to regulate the tension of the second chain without appreciably interfering with the first. This latter condition might be exactly complied with by causing the axle 12 to describe an elliptical curve whose focal points are adjacent the centres of the shafts 5 and 7; but I obtain a sufficient approximation by selecting a position for the axle 17 (Fig. 1) such that the circumference described by the centre of the axle 12 about the centre of the axle 17 will coincide within certain limits with the aforesaid elliptical curve.

In this manner, in order to properly regulate the tension of the two chains, 9 and 14, I first stretch the chain 9 by turning the axle 17 and without pivoting the bracket 16; then, with the axle, 17 in the fixed position, I pivot the bracket 16 by acting upon the screws 20 and 21, so that the chain 14 can be stretched while the chain 9 remains in the suitably stretched position.

Obviously, my said invention is not limited to the tension of chains for engines, and it is applicable to all mechanical apparatus utilizing two driving chains.

I claim:

1. A device for regulating the tension of two chains comprising a stationary frame, journals formed in said frame, an axle carried by the journals and being eccentric with respect to said journals, a forked bracket loosely mounted upon the axle and adjustable for pivotal movement about the same, and a shaft carried by said bracket and having a pair of adjacent and interconnected pinions adapted to receive the chains whereby through rotation of the eccentric axle and the pivoted action of the forked bracket, said shaft with the pinions may be brought into a position in which the chains will be properly stretched one independently from the other.

2. A chain tightener comprising a bracket, idler wheels journalled within said bracket, a shaft, means for pivotally supporting said bracket upon said shaft whereby said bracket may be rotatably adjusted about the same, means for retaining said bracket in its adjusted positions and journals for eccentrically supporting said shaft whereby said bracket and idler wheels carried thereby may be adjusted radially with respect to said journals.

3. The combination with a casing having a pair of angularly disposed chains arranged therein, a pair of interconnected idler gears for said chains, a bracket, a shaft journalled within said bracket and having said idler gears journalled thereupon, an extension formed with said idler gears shaft, set screws mounted within said casing and engaging said extension formed with said idler gears shaft, bearings mounted within said casing, a main shaft eccentrically journalled within said bearings and said bracket being rotatably mounted upon said main shaft.

In witness whereof I have hereunto set my hand.

ERNEST MAURICE BALLOT.